(12) United States Patent
Williams

(10) Patent No.: US 6,338,366 B1
(45) Date of Patent: Jan. 15, 2002

(54) PIPE INSULATION WITH A JACKET MEASURED IN FRACTIONS OF AN INCH

(76) Inventor: David R. Williams, P.O. Box 193465, Little Rock, AR (US) 72219-3465

( * ) Notice: Subject to any disclaimer, the term of this patent is extended or adjusted under 35 U.S.C. 154(b) by 0 days.

(21) Appl. No.: 09/757,482

(22) Filed: Jan. 11, 2001

(51) Int. Cl.⁷ .................................................. F16L 9/14
(52) U.S. Cl. .................... 138/149; 138/146; 138/151; 138/158; 138/161
(58) Field of Search ................. 138/149, 146, 138/151, 158, 161, 110

(56) References Cited

U.S. PATENT DOCUMENTS

| | | | |
|---|---|---|---|
| 3,628,572 A | * 12/1971 | Shannon | 138/149 |
| 3,815,640 A | 6/1974 | Iida et al. | |
| 3,875,971 A | * 4/1975 | Hamling | 138/146 |
| 3,891,009 A | * 6/1975 | Noda et al. | 138/149 |
| 3,958,582 A | * 5/1976 | Noda et al. | 138/149 |
| 4,054,711 A | 10/1977 | Botsolas | |
| 4,161,510 A | * 7/1979 | Edridge | 138/146 |
| 4,271,218 A | 6/1981 | Heckel et al. | |
| 4,485,057 A | 11/1984 | Kristensson et al. | |
| 4,530,884 A | * 7/1985 | Erickson et al. | 428/608 |
| 4,600,312 A | 7/1986 | Hyodo et al. | |
| 4,640,312 A | 2/1987 | Patell | |
| 4,925,605 A | 5/1990 | Petronko | |
| 5,017,314 A | 5/1991 | Zemanek et al. | |
| 5,400,830 A | * 3/1995 | Stiles et al. | 138/149 |
| 5,660,211 A | * 8/1997 | Hiraide et al. | 138/149 |
| 5,771,941 A | * 6/1998 | Almeida | 138/149 |
| 5,816,043 A | 10/1998 | Wolf et al. | |
| 6,004,626 A | 12/1999 | Noone et al. | |
| 6,030,672 A | 2/2000 | Usui | |

* cited by examiner

Primary Examiner—James Hook
(74) Attorney, Agent, or Firm—Richard C. Litman

(57) ABSTRACT

A pipe insulation and fire retardant composition and method for coating the inside and/or outside surfaces of a thin flexible metal, fiberglass or plastic jacket, and measured in fractions of an inch, for pipes and pipe fixtures carrying hot fluids, to markedly reduce the loss of heat.

8 Claims, 2 Drawing Sheets

PIPE INSULATION WITH A JACKET MEASURED IN FRACTIONS OF AN INCH

BACKGROUND OF THE INVENTION

1. Field of the Invention

The present invention relates generally to insulated pipe jackets. More specifically, the present invention is a thin, insulating film coated on the inside surface of a thin cover or jacket for pipes carrying hot fluids to markedly reduce the loss of heat.

2. Description of the Related Art

The related art of interest describes various insulative coatings, but none discloses the present invention. There is an ergonomic need for increasing the insulative effect of thin metal, fiberglass or plastic covers of pipes carrying hot fluids to save on the loss of heat to the ambient region, and further, serve as a fire retardant.

The related art will be discussed in the order of perceived relevance to the present invention as to the coating compositions for pipe insulation.

U.S. Pat. No. 4,271,218 issued on Jun. 2, 1981, to Klaus Heckel et al. describes insulated jackets for pipes carrying cold fluids. A first embodiment of a pipe insulating jacket is made of a 5–20$\mu$ thick polyester film coated on a 10–40$\mu$ (18$\mu$ preferred) thick aluminum foil on the outside, and a 20–50$\mu$ thick film of an uncrosslinked polyethylene coated on the inside. The second embodiment consists of an aluminum foil coated underneath with an unfoamed, uncrosslinked polyethylene coating, and a soft innermost foam layer of a closed-cell, crosslinked polyethylene having a bulk density of 20 to 50 kg/m$^3$ (30 kg/m$^3$ preferred) and a coating thickness of about 30$\mu$. The pipe insulating jacket is distinguishable for its application only to pipes carrying cold fluids.

U.S. Pat. No. 4,485,057 issued on Nov. 27, 1984, to Olle Kristensson et al. describes a method of producing insulated pipeline components by enclosing the pipe section in a casting mold and injecting expandable polyurethane. The pipeline insulator is distinguishable for utilizing only expandable polyurethane which is a known fire hazard.

U.S. Pat. No. 3,815,640 issued on Jun. 11, 1974, to Kosuke Iida et al. describes an elongated pipe tightly coated with a projection-formed synthetic resin based on an organic solvent and not amenable to an aqueous solvent. Three resin combinations are coated on a phosphate layer formed on the steel pipe and comprise (1) a first adhesive layer having as an example, a terpolymer of an acrylic, acrylamide, styrene, and phenol resin dissolved in acetone and toluene which is baked; (2) a second adhesive layer of a terpolymer of a vinyl chloride, vinyl acetate, maleic anhydride, and butadiene rubber in a similar solvent which is baked; and (3) a third vinyl chloride coating having extruded annular projections at regular intervals. The pipe coatings are distinguishable for their multiple layers and required annular projections.

U.S. Pat. No. 6,004,626 issued on Dec. 11, 1999, to Kenneth Noone et al. describes a sprayed castable refractory composition in Table II applied on a refractory surface comprising (1) 63.75 wt. % of 4 mesh and smaller 60% aluminum oxide or 65 wt. % of calcined clay aggregate (40–50% aluminum oxide); (2) up to 15 wt. % of less than 325 mesh raw Kyanite or aluminum silicate; (3) 6–11 wt. % of less than 325 mesh aluminum oxide; (4) 6 wt. % of microsilica; (5) 4–8 wt. % of calcium aluminate cement; and (6) minor amounts of a condensed dispersant, a sulfonated naphthalene salt, polypropylene fibers, and citric acid as a set retarder.

U.S. Pat. No. 4,054,711 issued on Oct. 18, 1977, to Christos J. Botsolas describes a flexible multilayer thermal insulation pipe jacket comprising from the exterior layer, a polyvinyl fluoride film bonded by an adhesive to a thick layer of a felted asbestos paper incorporating a fiberglass scrim cloth. An aluminum coating is adhered to the opposite side of the asbestos paper and covered with a polyester film which contacts the pipe. The pipe jacket composition is distinguishable for utilizing asbestos which is not permitted today.

U.S. Pat. No. 4,600,00 issued on Jul. 15, 1986, to Masakat:su Hyodo et al. describes a lining material for a tubular textile pipe jacket for reinforcing pipe lines made from an outer coating of a thermoplastic polyester elastic resin and an inner coating of a thermoplastic polyurethane elastic resin. The lining material is distinguishable for its specific two-layer coating for an existing textile pipe jacket.

U.S. Pat. No. 4,640,312 issued on Feb. 3, 1987, to Farrokh A. Patell et al. describes a prefabricated on-site insulated pipeline section having a one-piece cast cured and dried insulative layer formed of a lightweight aggregate in foamed portland cement. The pipe insulation is distinguishable for its one-piece foamed portland cement composition.

U.S. Pat. No. 5,017,314 issued on May 21, 1991, to Jiri Zemanek et al. describes a process for forming detachable pipeline insulation shells by (1) forming a sheet metal jacket with ring spacer disk ends around a section of a pipeline; (2) blowing in particles of rock wool, glass, perlite or vermiculite; (3) wetting with sodium silicate solution; and (4) curing. The pipeline insulation is distinguishable for its singular mineral composition having only contacting surfaces bonded by sodium silicate.

U.S. Pat. No. 5,816,043 issued on Oct. 6, 1996, to Jerry M. Wolf et al. describes an engine manifold heat shield comprising two formed sheets of aluminum foil or stainless steel containing in the space between them a fibrous insulating material selected from fiberglass, basalt mineral, ceramic and mixtures thereof. The insulating shield is distinguishable for its metal sandwiched insulation structure.

U.S. Pat. No. 4,925,605 issued on May 15, 1990, to Dennis A. Petronko describes a unitary removable and reusable 3-layered jacket for thermal insulation of pipe accoutrements such as valves comprising a heat and water resistant outer fabric layer, a hardened rigid-cell polyurethane middle layer, and a thin flexible heat-shrinkable plastic inner layer. The middle layer is formed by injecting polyol and isocyanate. The jacket is distinguishable for its combustible three-layered structure comprising an outer fabric layer, a foamed polyurethane and an inner plastic layer.

U.S. Pat. No. 6,030,672 issued on Feb. 29, 2000, to Masayoshi Usui describes a 600–1200 micron thick resin coating for stainless steel pipes comprising an outer 3–10 micron thick epoxy resin or a 10–300 micron thick polyamide resin, e.g., nylon. The resin coatings are distinguishable for adaptation to prevention of corrosion and lacking insulating properties.

None of the above inventions and patents, taken either singularly or in combination, is seen to describe the instant invention as claimed. Thus, an insulating and fire retardant metal pipe jacket measured in fractions of an inch solving the aforementioned problems of cost and thickness is desired.

SUMMARY OF THE INVENTION

The present invention is directed to a pipe insulation composition and method for coating a thin metal, fiberglass or plastic jacket with an insulation and fire protective composition measured in fractions of an inch on the inside surface or both surfaces of the jacket for pipes carrying hot fluids, to markedly reduce the loss of heat, and further, inhibit fire damage. The thin jacket affords a further advantage of covering pipes in tight-space situations.

Accordingly, it is a principal object of the invention to provide a thin walled insulating and fire protective pipe covering.

It is another object of the invention to provide a thin walled insulating and fire protective pipe covering comprising a thin metal, fiberglass or plastic jacket coated on the inside or on both sides with an insulating and fire preventing composition.

It is a further object of the invention to provide a thin walled insulating and fire protective pipe covering comprising a thin jacket coated with a composition containing perlite and clay particles in the shape of platelets and spheres, and in a micron size range.

Still another object of the invention is to provide a thin walled insulating and fire protective pipe covering comprising a thin jacket coated with a ceramic composition containing acrylic and/or urethane resins, and optionally, silicone resins.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently in the drawings.

DETAILED DESCRIPTION OF THE PREFERRED EMBODIMENT

The present invention is directed to the insulation composition coated on the inside or both sides of insulating coverings for pipes carrying hot fluids.

Figure 1A:
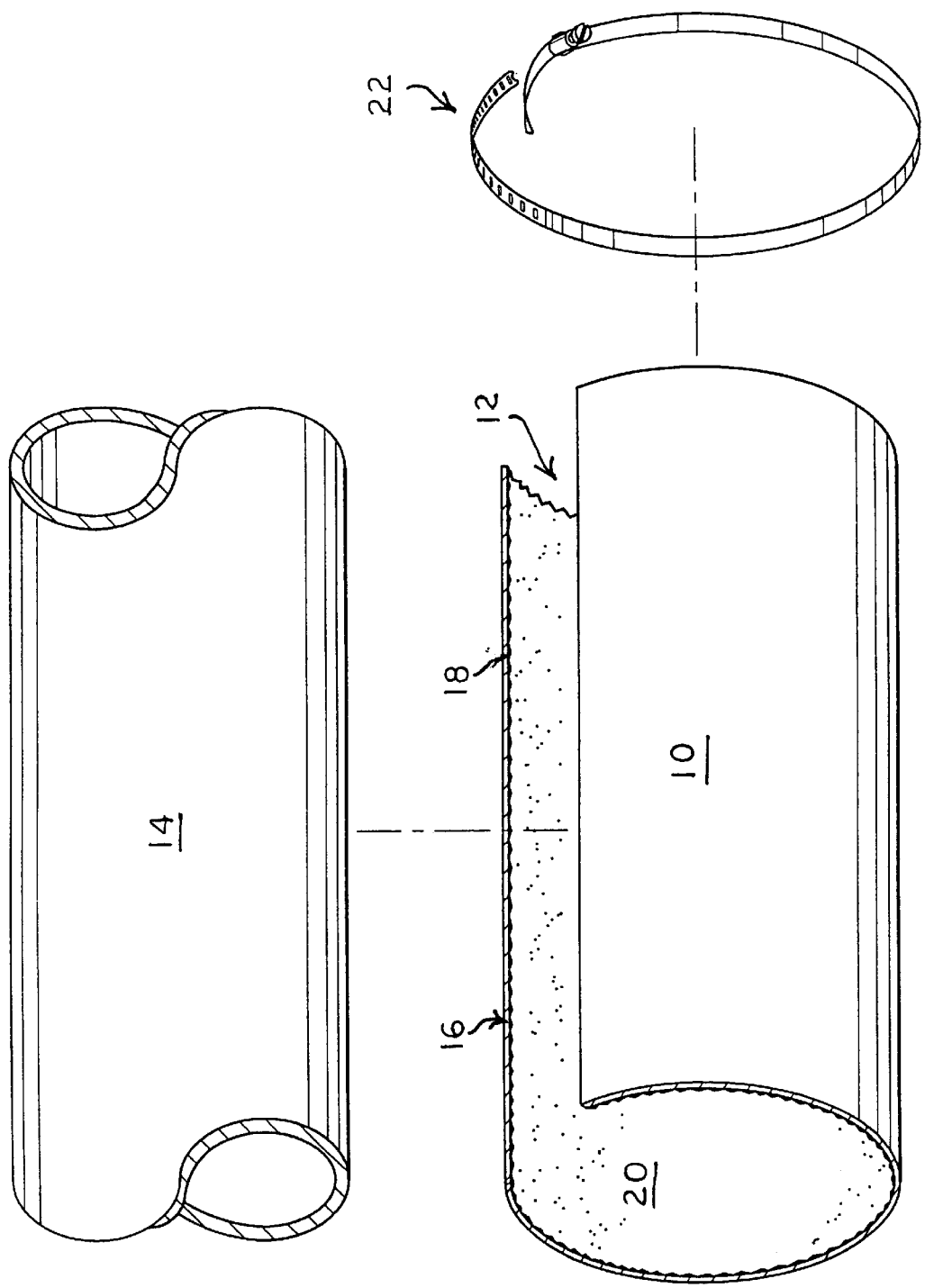
FIG. 1A is an exploded elevational view of a metal pipe to be covered with a metal, fiberglass or plastic jacket coated on its inner surface with the inventive insulation composition measured in fractions of an inch according to the present invention.
Figure 1B:
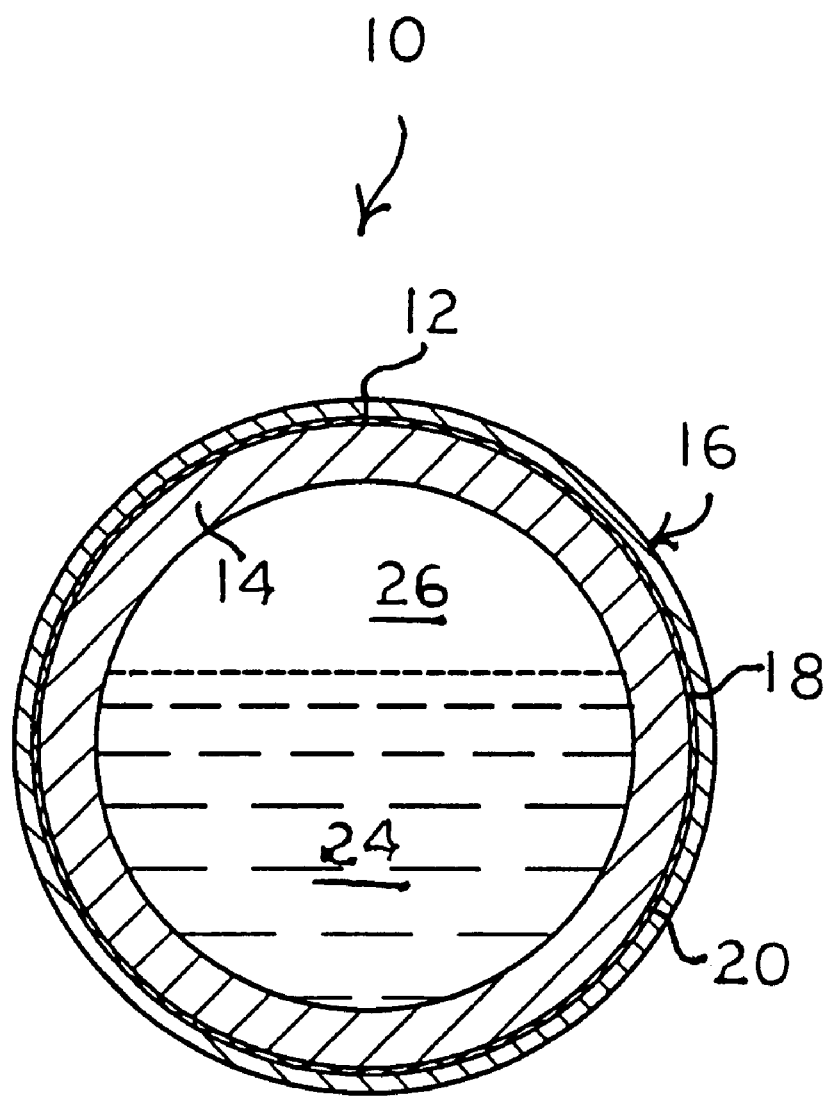
FIG. 1B is a cross-sectional view of a pipe containing hot liquid or gases and covered with the metal, fiberglass or plastic jacket of the present invention.

In FIGS. 1A and 1B, a first embodiment of the present inventive jacket 10 is shown with a longitudinal separation or slot 12 for covering a conventional metal or plastic pipe 14. The jacket 10 comprises a thin metal, fiberglass or plastic layer 16 covered on its inside surface 18 with a thin coating of a ceramic coating 20 which is pliable. However, as noted above, both sides of the jacket 10 can have the layer 16. A conventional pipe clamp 22 is shown in FIG. 1A for clamping the jacket 10 securely around the pipe 14 with a plurality of clamps 22. It is also contemplated to wrap the jacket 10 at least twice around the pipe 14.

In FIG. 1b, a hot fluid 24 is shown passing through the pipe 14. It should be noted that the hot fluid 24 can be entirely superheated steam or vapor 26 shown above the hot condensed fluid 22.

A second embodiment of the present invention embodies the coating 20 applied to the outside surface of the jacket 10.

The preferred ceramic compositions utilized in the coating composition are perlite, hydrous aluminate silicates, and manufactured synthetic materials which are ground to less than approximately 75 microns. Acrylic resins are added to provide flexibility, adhesion and durability to the coating composition. Aliphatic urethane resins are added for weatherability and resistance to acids and chemicals. Other resins such as silicones can be added to extend the life of the resin system. For extremely hot surfaces, urethane resins are omitted. The concentration of the ceramic compositions added to a pound of water vary from 0.04 to 1.2 pounds.

A 7 mil ceramic coating 20 has been determined to stay intact to at least 2,000° F. and does not become intumescent. Therefore, the coating becomes pliable and glazed when exposed to fire. It has been determined that a bare hot pipe surface of 324° F. has been reduced to 84° F. by utilizing the jacket 10. The coating 20 is not affected as typically for ceramic coatings by high humidity and water immersion. Other valuable properties include resistance to corrosion and formation of fungus and mildew.

The ceramic coating 20 in the range of 30 to 250 mils can be applied by brush, roller or spraying which is preferred to either side of the pipe jacket 10. The coating 20 is environmentally safe.

Although only a straight pipe has been illustrated, the pipe jacket 10 can be readily configured to fit bends and pipe accoutrements such as valves.

It is to be understood that the present invention is not limited to the embodiments described above, but encompasses any and all embodiments within the scope of the following claims.

I claim:
1. A pipe insulating jacket measured in fractions of an inch comprising:
    a thin flexible sheet having an inside surface and an outside surface adapted to surround and conform to a pipe; and
    a thin ceramic coating deposited on at least one of the inside and outside surfaces of the sheet, wherein the coating contains resins selected from the group consisting of aliphatic urethanes, acrylic, silicones, and mixtures thereof;
    whereby the thin ceramic coated jacket can be attached to a pipe or pipe fitting by fasteners to form an environmentally safe pipe insulator and fire preventive jacket.
2. The pipe insulating jacket according to claim 1, wherein the thin ceramic coating is a water based composition.
3. The pipe insulating jacket according to claim 1, wherein the thin ceramic coating contains ceramic compositions selected from the group consisting of perlite, hydrous aluminum silicate and mixtures thereof.
4. The pipe insulating jacket according to claim 1, wherein the ceramic coating is applied in a thickness range of from about 30 to about 250 mils.
5. A method of insulating a hot fluid carrying pipe or pipe fixture with a thin jacket comprising:
    providing a thin flexible sheet selected from the group consisting of metal, fiberglass and plastic having an inside surface and an outside surface adapted to surround and conform to a pipe or pipe fixture;
    depositing a thin ceramic coating on at least one of the inside and outside surfaces, wherein the coating con- tains resins selected from the group consisting of aliphatic urethanes, acrylic, silicones, and mixtures thereof; and fastening the coated flexible sheet to a pipe or pipe fixture;

whereby the pipe or pipe fixture is insulated and protected from fire damage by the thin ceramic coated pipe jacket.

6. The method of insulating a hot fluid carrying pipe or pipe fixture with a thin jacket according to claim 5, wherein the ceramic coating is based on an aqueous composition.

7. The method of insulating a hot fluid carrying pipe or pipe fixture with a thin jacket according to claim 5, wherein the thin ceramic coating contains ceramic compositions selected from the group consisting of perlite, hydrous aluminum silicate and mixtures thereof.

8. The method of insulating a hot fluid carrying pipe or pipe fixture with a thin jacket according to claim 5, wherein the ceramic coating is applied in a thickness range of from about 30 to about 250 mils.

* * * * *